(12) United States Patent
Lin et al.

(10) Patent No.: US 8,157,998 B2
(45) Date of Patent: Apr. 17, 2012

(54) DEVICE FOR SEPARATING OUT RADIOISOTOPE THALLIUM-201

(75) Inventors: Wuu-Jyh Lin, Longtan Township, Taoyuan County (TW); Jenn-Tzong Chen, Taipei (TW); Sun-Rong Huang, Longtan Township, Taoyuan County (TW); Ying-Ming Tsai, Pingjhen (TW); Jainn-Hsin Lu, Longtan Township, Taoyuan County (TW)

(73) Assignee: Atomic Energy Council—Institute of Nuclear Energy Research, Taoyuan (TW)

( * ) Notice: Subject to any disclaimer, the term of this patent is extended or adjusted under 35 U.S.C. 154(b) by 299 days.

(21) Appl. No.: 12/621,979

(22) Filed: Nov. 19, 2009

(65) Prior Publication Data
US 2010/0320136 A1     Dec. 23, 2010

(30) Foreign Application Priority Data
Jun. 18, 2009    (TW) .................................. 098120396

(51) Int. Cl.
*B01D 59/26* (2006.01)
(52) U.S. Cl. .................. 210/257.1; 210/257.2; 210/258; 210/259; 210/266; 210/287; 210/416.1; 210/418; 210/502.1; 376/195; 422/500; 422/528; 422/535; 422/537; 422/558
(58) Field of Classification Search ............... 210/257.1, 210/257.2, 258, 259, 266, 287, 416.1, 418, 210/502.1; 376/189, 195; 422/500, 528, 422/535, 537, 558
See application file for complete search history.

(56) References Cited

U.S. PATENT DOCUMENTS

| 3,993,538 | A  | * | 11/1976 | Lebowitz et al. | ............. | 376/195 |
| 6,787,042 | B2 | * | 9/2004  | Bond et al.     | ................. | 210/681 |
| 2007/0098607 | A1 | * | 5/2007 | Tang et al.     | ........................ | 423/2   |
| 2008/0063571 | A1 | * | 3/2008 | Lin et al.      | ........................ | 422/101 |

* cited by examiner

*Primary Examiner* — Matthew Savage
(74) *Attorney, Agent, or Firm* — Jackson IPG PLLC; Demian K. Jackson

(57) ABSTRACT

Disclosed is a device for separating radioisotope thallium-201. The device includes an evaporation unit for a solution vial, a first glass vial connected to a first valve and a second valve, an ion exchange column connected to a third valve, a second glass vial connected to a fourth valve and a fifth valve, a collection vial for receiving solution from the fifth valve, a product vial with a membrane filter and a vacuum unit connected to the first valve, the fourth valve and a sixth valve. This device can separate out high-concentration thallium-201 solution from which radioisotope thallium-201 can be obtained.

2 Claims, 2 Drawing Sheets

DEVICE FOR SEPARATING OUT RADIOISOTOPE THALLIUM-201

BACKGROUND OF INVENTION

1. Field of Invention

The present invention relates to a device for separating out radioisotope thallium-201 and, more particularly, to a device for separating out high-concentration radioisotope thallium-201.

2. Related Prior Art

Thallium-201 hallous chloride can be absorbed by and collected in myocardium fast so that it can not only be used in myocardial imaging for diagnosing heart diseases but also in tumor imaging and other diagnosis. Therefore, thallium-201 is one of the most popular radioisotopes in the nuclear medicine.

As discussed in Qaim S. M., Weinreich R. and Ollig H., Production of Tl-201 and Pb203 via Proton Induced Nuclear Reaction on Natural Thallium, International Journal of Applied Radiation and Isotopes, 30 (1979), pp. 85-95, thallium-201 is obtained by washing which inevitably gets impurities in the thallium-201. Therefore, the purity of the resultant thallium-201 is low.

Therefore, the present invention is intended to obviate or at least alleviate the problems encountered in prior art.

SUMMARY OF INVENTION

It is the primary objective of the present invention to provide a device for separating out high-concentration radioisotope thallium-201.

To achieve the foregoing objective, the device includes an evaporation unit for containing at least one solution vial, a first glass vial, a first valve connected to the first glass vial, a second valve connected to the first glass vial, an ion exchange column connected to the second valve, a third valve connected to the ion exchange column, a second glass vial, a fourth valve connected to the second glass vial, a fifth valve connected to the second glass vial, a collection vial for receiving solution from the fifth valve, a product vial for receiving solution from the fifth valve, a membrane filter for filtering the solution before it reaches the product vial, a sixth valve connected to the product vial opposite to the membrane filter, and a vacuum unit connected to the first, fourth and sixth valves.

Other objectives, advantages and features of the present invention will become apparent from the following description referring to the attached drawings.

BRIEF DESCRIPTION OF DRAWINGS

The present invention will be described via detailed illustration of the preferred embodiment referring to the drawings.

DETAILED DESCRIPTION OF PREFERRED EMBODIMENT

Figure 1:
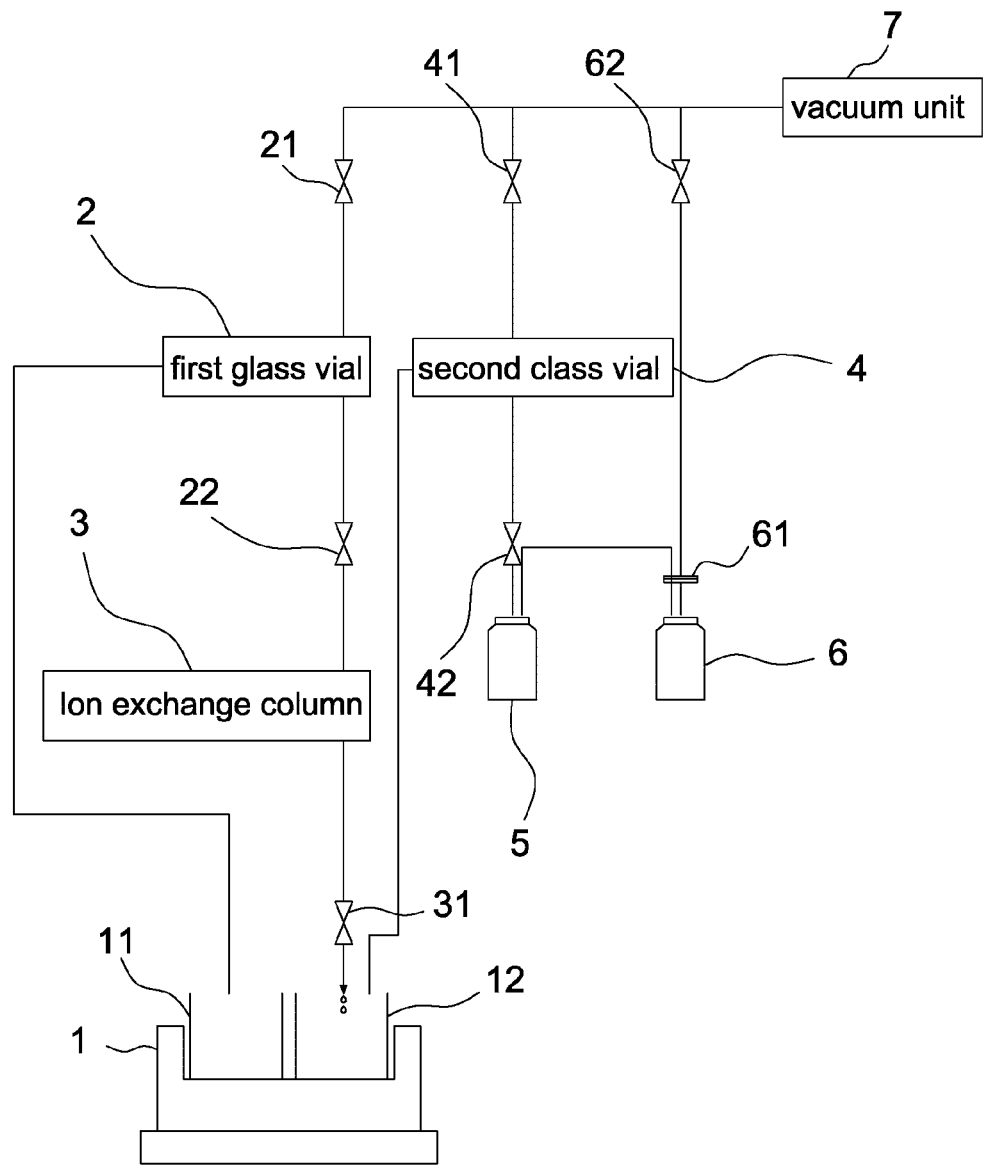
FIG. 1 is a block diagram of a device for separating out radioisotope thallium-201 according to the preferred embodiment of the present invention.

Referring to FIG. 1, there is shown a device for separating out radioisotope thallium-201 according to the preferred embodiment of the present invention. The device includes an evaporation unit 1 for a solution vial, a first glass vial 2 connected to a first valve 21 and a second valve 22, an ion exchange column 3 connected to a third valve 31, a second glass vial 4 connected to a fourth valve 41 and a fifth valve 42, a collection vial 5 for receiving solution from the fifth valve 42, a product vial 6 equipped with a membrane filter 61 and a vacuum unit 7 connected to the first valve 21, the fourth valve 41 and a sixth valve 62. This device can separate out high-concentration thallium-201 liquid from which radioisotope thallium-201 can be obtained. The solution vial receives solution from the third valve 31. The product vial 6 receives solution from the collection vial 5. The membrane filter 61 membrane filters out bacteria and impurities from the solution from the collection vial 5.

Figure 2:
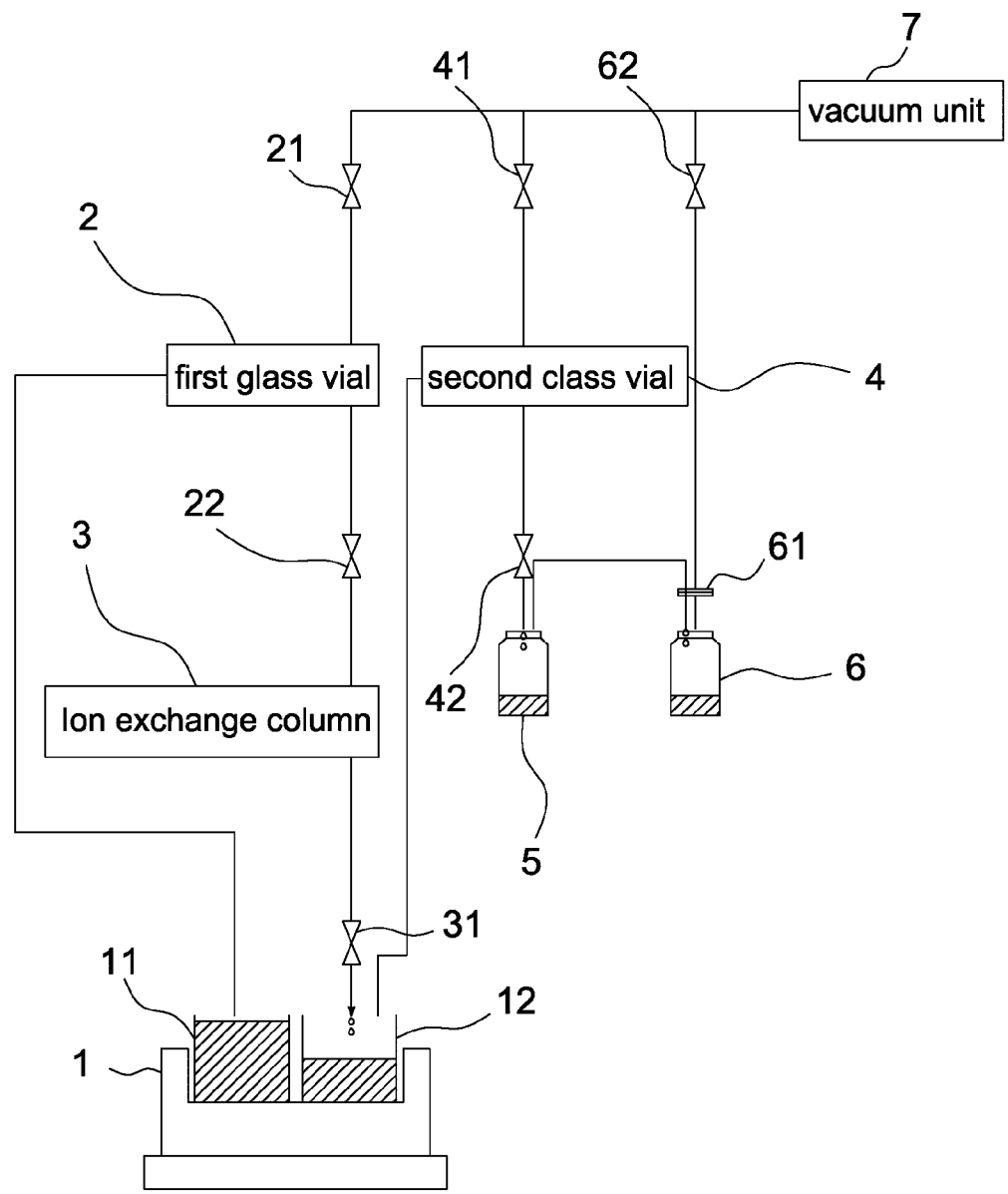
FIG. 2 is a block diagram of the device in another position than shown in FIG. 1.

Referring to FIG. 2, thallium-201 liquid and 1.2N HCl ($SO_2$) are filled into a first solution vial 11 before the first solution vial 11 is disposed in the evaporation unit 1. The first valve 21 is opened to allow air to be sucked into the vacuum unit 7 from the first glass vial 2 and the mixture of the thallium-201 with the HCl ($SO_2$) into the first glass vial 2 from the solution vial 11. The first valve 21 is shut again after an adequate amount of mixture is fed into the first glass vial 2.

Then, the second valve 22 is opened to allow the mixture to travel into the ion exchange column 3 from the first glass vial 2. Resin is used to conduct ion exchange. Then, the second valve 22 is shut while the third valve 31 is opened to allow the solution to travel into a second solution vial 12 disposed in the evaporation unit 1 after the ion exchange.

Subsequently, saline is filled into the second solution vial 12, and the fourth valve 41 is opened to allow air to be sucked into the vacuum unit 7 from the second solution vial 12 and the solution to be fed into the second glass vial 4 from the second solution vial 12. After an adequate amount of solution is fed into the second glass vial 4, the fourth valve 41 is closed again while the fifth valve 42 is opened to allow the solution to travel into the collection vial 5 from the second glass vial 4.

Finally, the sixth valve 61 is opened to allow air to be sucked into the vacuum unit 7 from the product vial 6 and the solution to be fed into the product vial 6 from the collection vial 5. With the membrane filter 61, bacteria and impurities are membrane filtered from the solution on the way into the product vial 6. Thus, high-concentration thallium-201 solution is collected in the product vial 6. Thallium-201 can be obtained from the thallium-201 solution.

With the device of the present invention, lead-201 solution can be separated out from thallium-203 solid target material fast. By decay and ion exchange, the lead-201 solution can be converted into radioisotope thallium-201 solution.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A device for separating out radioisotope thallium-201 comprising:
    an evaporation unit containing a first solution vial and a second solution vial;
    a first glass vial connected to the first solution vial;
    a first valve connected to the first glass vial;
    a second valve connected to the first glass vial;
    an ion exchange column connected to the second valve;
    a third valve connected to the ion exchange column;
    a second glass vial;
    the second solution vial being connected to the third valve and the second glass vial;
    a fourth valve connected to the second glass vial;

a fifth valve connected to the second glass vial;
a collection vial connected to the fifth valve for receiving solution from the fifth valve;
a membrane filter connected to the collection vial for filtering the solution;
a product vial connected to the membrane filter for receiving filtered solution;
a sixth valve connected to the product vial; and
a vacuum unit connected to the first, fourth and sixth valves.

2. The device according to him and him and him and him and him and him to claim 1, wherein solution is transferred into the second solution vial from the third valve.

* * * * *